Inventor
Friedhelm Brinkmeier
By Stevens, Davis, Miller & Mosher
Attorneys

April 22, 1969      F. BRINKMEIER      3,439,470

MACHINE FOR CLOSING BAGS

Filed Jan. 28, 1965      Sheet 4 of 4

Inventor
Friedhelm Brinkmeier
By Stevens Davis Miller & Mosher
Attorneys

# United States Patent Office 3,439,470
Patented Apr. 22, 1969

3,439,470
MACHINE FOR CLOSING BAGS
Friedhelm Brinkmeier, Ladbergen, Overbeck, Germany, assignor to Windmoller & Holscher, Lengerich, Westphalia, Germany
Filed Jan. 28, 1965, Ser. No. 428,645
Claims priority, application Germany, Feb. 4, 1964,
W 36,119
Int. Cl. B65b 57/02
U.S. Cl. 53—70                                  5 Claims

ABSTRACT OF THE DISCLOSURE

Apparatus is disclosed for closing filled plastic bags and simultaneously securing information sheets to the bags. The apparatus includes an arrangement for conveying the bag which cooperates with a mechanism for guiding the edges of the open ends of filled bags. In addition, a mechanism is provided for feeding information sheets to the bags, and a welding device is provided to close the bags by means of a weld seam and simultaneously to join the information sheets to the bag. The guiding arrangement consists of oppositely facing conveyor belts with an aligning plate disposed to one side of the belts.

---

Figure 1:
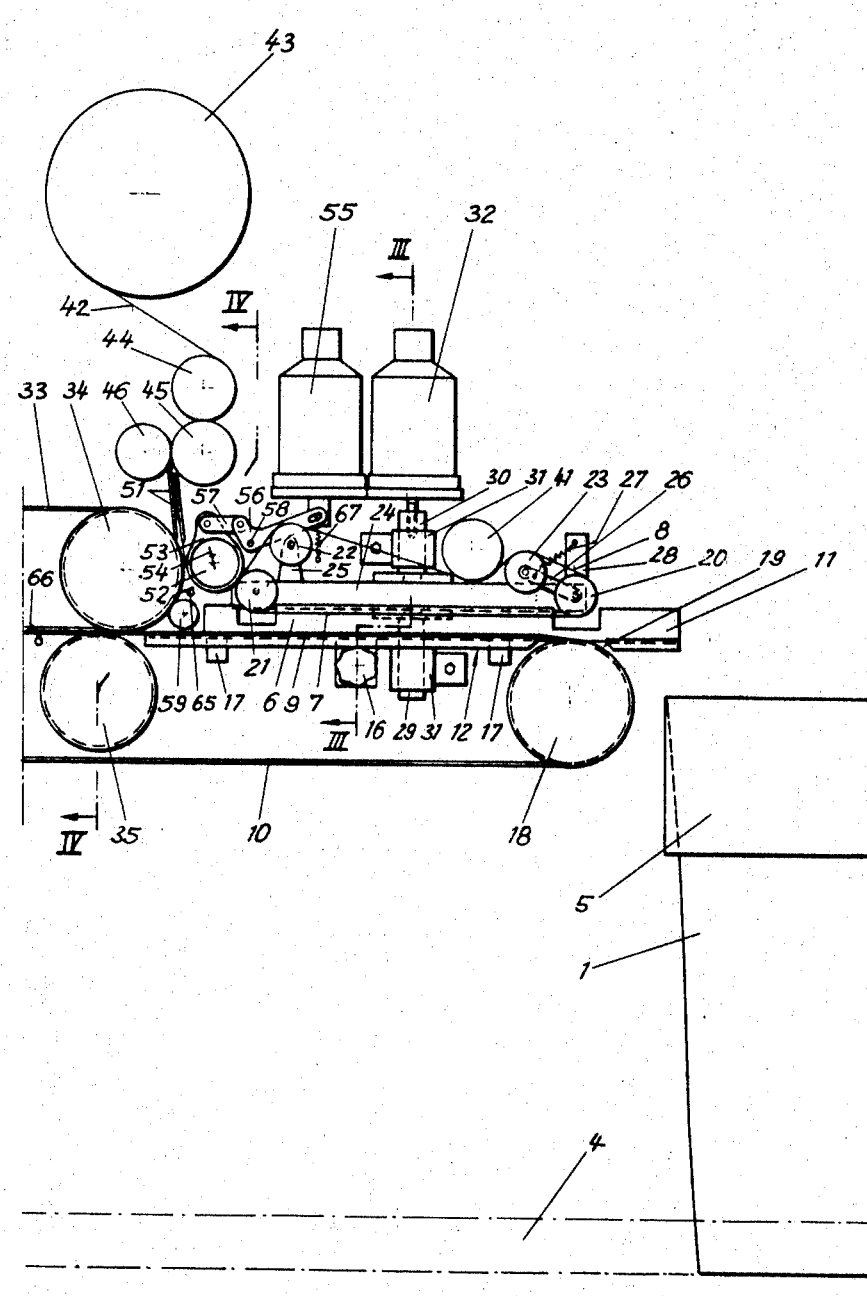

This invention relates to a sack of plastics material, which is closed in a filled condition by a transverse weld on its initially open top end. Such sacks of plastics materials are used on a large scale for shipping and storing artificial fertilizer. As the fertilizer differ in composition, the contents of the sacks must be indicated. Such information was previously provided by printing a statement of contents in addition to advertising matter or a statement of origin on the sacks during their manufacture or on the starting material before the manufacture of the sacks.

It has been found in practice, however, that a printed statement of contents is not suitable in many cases because it involves the need for keeping in the premises of the filler an unreasonably large stock of empty sacks bearing all possible content information. This involves a large space requirement and monetary expenditure.

This disadvantage that a large stock of sacks must be kept and the mixture to be filled is restricted to the mixing ratio printed on the sacks far in advance is to be eliminated by the present invention. Relating to a sack of thermoplastic sheeting, which is closed in a filled condition by a closing seam weld at one end, and which serves particularly for storing artificial fertilizer, the invention resides in that the closing seam weld joins a thermoplastic information sheet, which bears an imprint or the like to indicate the contents of the sack. The information sheet, which is separate from the rest of the sack before the closing seam weld is applied, permits the use of one and the same sack pattern for different contents and different mixed contents. Instead of sacks bearing different imprints, only information sheets bearing different imprints must be kept in stock by the filler. It will be understood that the imprint on the information sheets need not be restricted to the statement of contents. For instance, instructions for use or the like may be printed on the information sheets. Besides, any imprint on the sack itself may be provided independently of the contents of the sack. The joining of the information sheet by the closing seam weld does not require additional operations and ensures a much better and more reliable attachment than is obtained when the information sheet is attached to the sack of plastics material by stitching, stapling or the like operations.

The method according to the invention for closing sacks of plastics materials and for attaching information sheets to such sacks is characterized in that the sack edges confining the filling opening are caused to contact each other and are laterally bent, preferably through 90°, an information sheet is applied to the outside wall of the sack near the top margin of the latter, and a closing seam weld is applied, which closes the filling opening and joints the information sheet to the sack wall. During the introduction of each sack, an information sheet may be severed by cutting or tearing along a transverse series of perforations from a plastics material web withdrawn from a supply roll.

For carrying out the method just described, the invention provides an apparatus which comprises a sack conveyor, an aligning and guidance device for the edges of the open ends of the filled sacks, a feeder for the information sheets, and a welding station for applying the closing seam welds which join the information sheets. The guiding device may comprise two conveyor belts and an aligning plate disposed behind these belts on one side, the driving, reversing and tensioning pulleys for one of the conveyor belts being mounted on a common carrier, which is adapted to be moved towards the other conveyor belt by a suitable lifting device soon after the arrival of a sack end to be closed. It is particularly suitable if the feeder for the information sheets is adapted to be started, by a switch, which is disposed in the path of the incoming sack edge portions. As a result, the operator need only insert the sack edges into the receiving slot and urge one conveyor belt against the other, whereas the subsequent application of the information sheet and the formation of the closing seam weld are automatically performed.

The feeder may comprise withdrawing rollers for an information sheet web, which is wound up in a supply roll and provided with transverse series of perforation, which rollers feed the free end of the web between two disengaged pressure rollers, one of which rotates continuously, and the switch may energize a positioning device for moving the pressure rollers toward each other. As soon as the pressure rollers are moved toward each other and engage the free end of the information sheet web, the leading sheet of said web is torn off along the next transverse series of perforations and fed to the sack to be processed. Behind the pressure rollers, considered in the direction of movement of the information sheet web, another switch may be disposed in the path of the information sheet web to de-energize the drive means for the withdrawing rollers when said other switch is engaged by the free end of the web so that a sheet is torn from the information sheet web when the latter is at a standstill.

On the other hand, the feeder may comprise photocell-controlled withdrawing rollers for an information sheet web wound up in a supply roll, and these withdrawing rollers may feed the free end of the web to such an extent between the open cutting edges of a cutter operated by the switch that the free end is stopped in a position in which it is spaced from the cutter by the length of one information sheet, and a further conveyor may be provided, which feeds the severed information sheet to the sack workpiece.

Finally, it may be desirable according to the invention in all embodiments described hereinbefore to provide a squaring knife for the sack edges and the information sheets thereon between the information sheet feeder and the welding station. This will reliably ensure that the information sheets and sack edges are aligned during the welding operation and a satisfactory seam weld is obtained.

Figure 2:
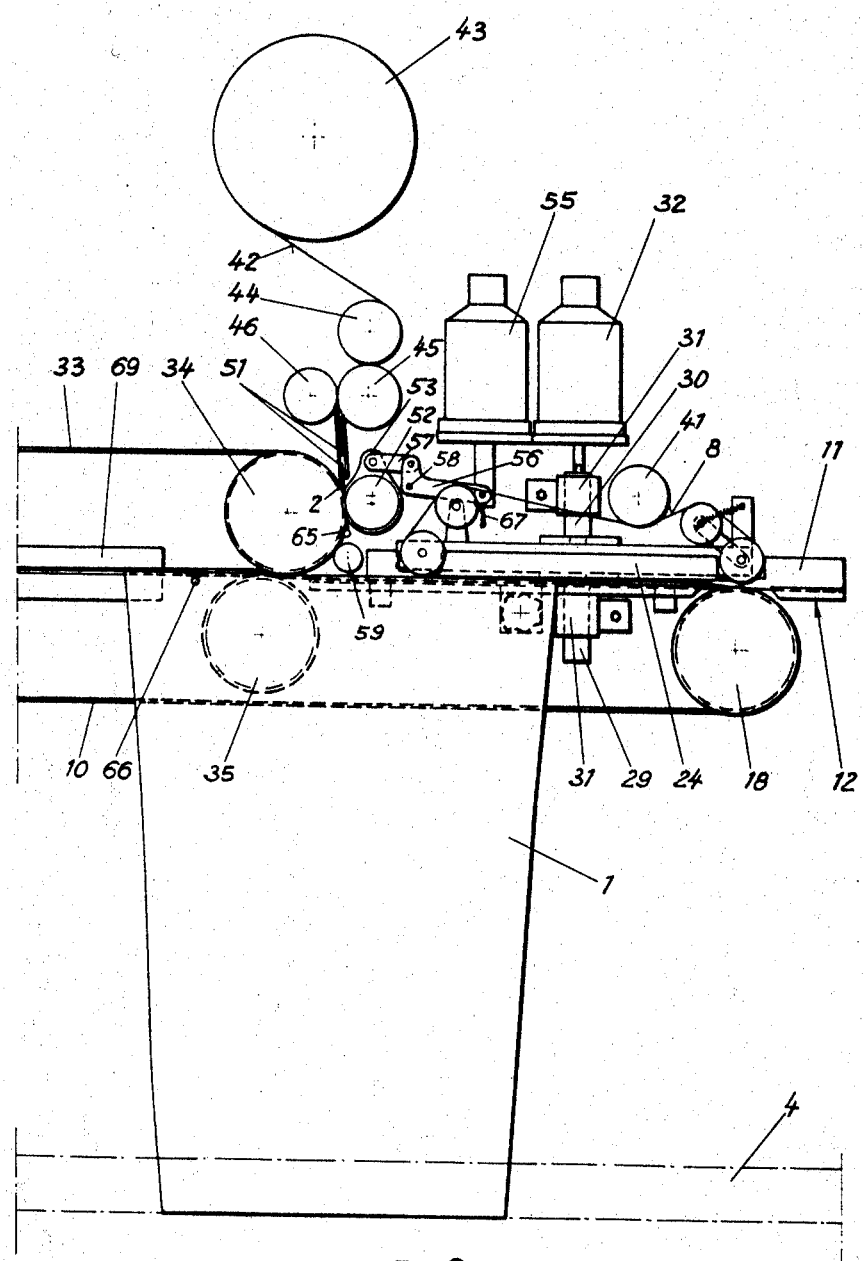
Figure 3:
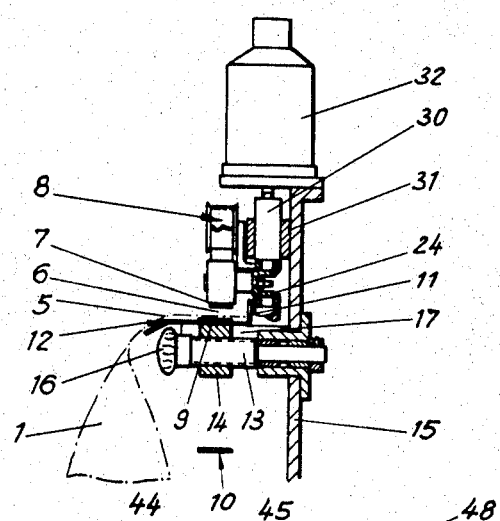
Figure 4:
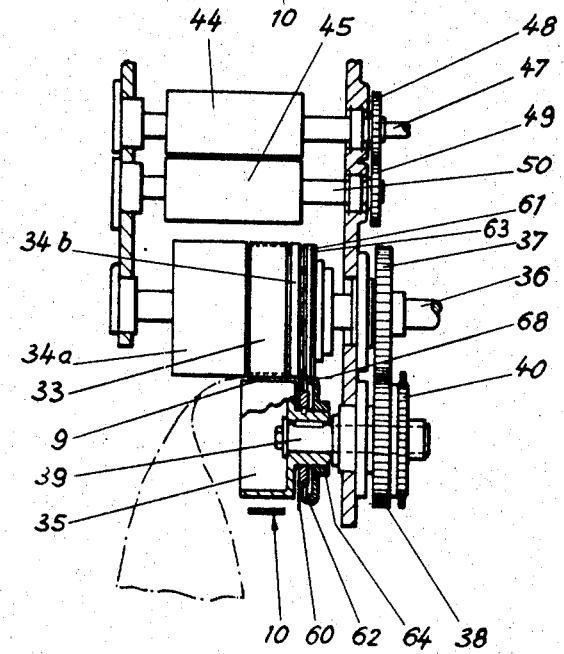
Figures 5, 6, 7:
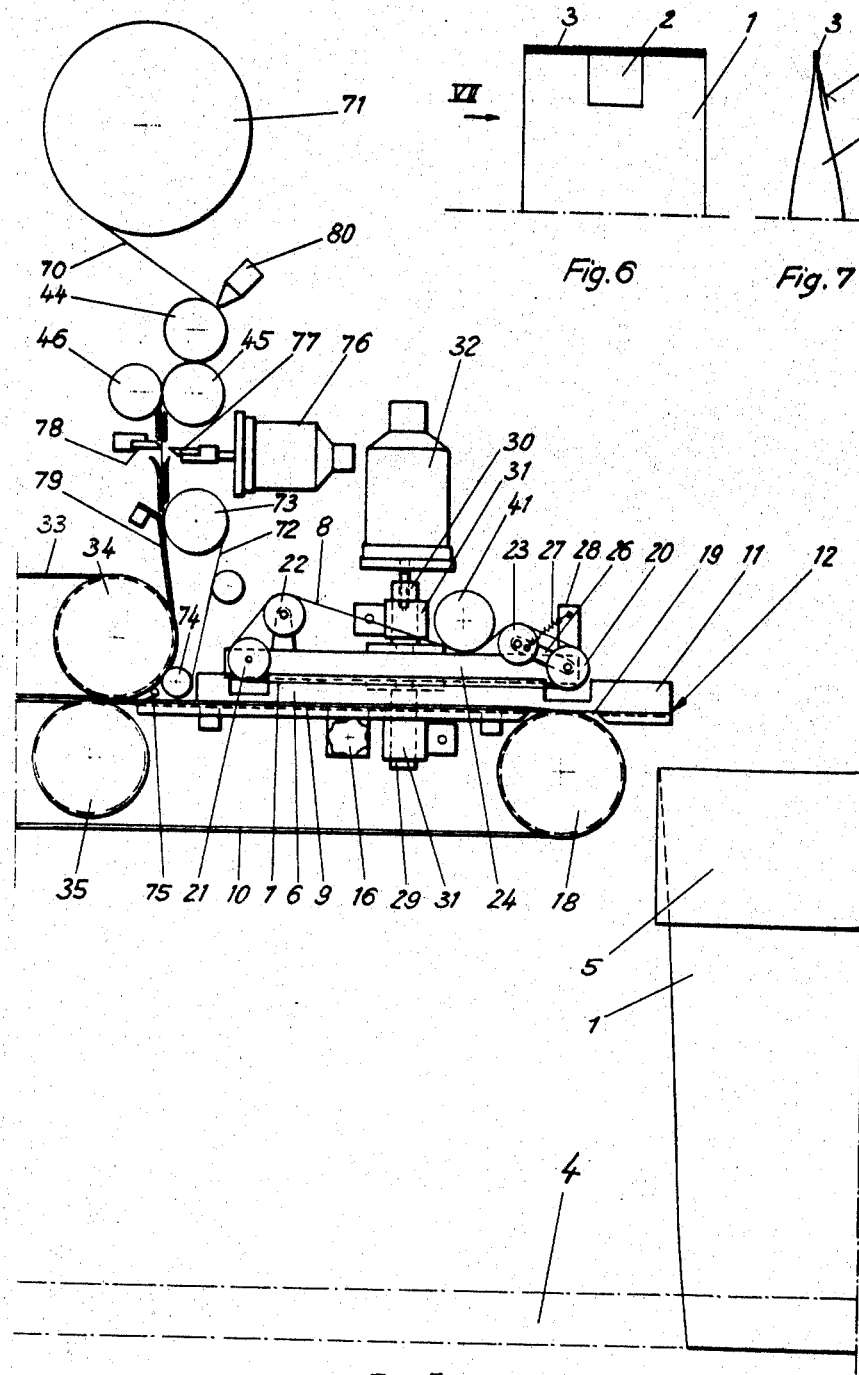

Further details of the invention will be explained more fully in the following description with reference to the drawing, in which:

FIG. 1 is a front elevation showing a first embodiment of the novel apparatus in receiving condition, FIG. 2 shows the apparatus of FIG. 1 during the passage of a filled sack of plastics material, FIGS. 3 and 4 are sectional views taken on lines III—III and IV—IV, respectively, of FIG. 1, FIG. 5 is a view similar to FIG. 1 and showing a second embodiment of the apparatus, FIG. 6 is a front elevation of the filling end of the novel plastics material sack, which is provided with a closing seam and an information sheet, and FIG. 7 is an elevation showing the filling end as viewed in the direction of the arrow VII in FIG. 6.

The sack according to the invention is a sack 1 of plastics material (FIGS. 6 and 7), which is closed in a filled condition by a transverse seam weld at its intially open top end. To avoid an imprint on the sack material to furnish information on the contents of the sack, a separate information sheet 2 of plastics material is provided, which is joined by the closing seam 3 and is thus firmly attached to the sack. The information sheet bears all information which is required.

With reference to FIGS. 1 to 4, the novel method and a first embodiment for carrying out this method will now be described. A continuously operated sack conveyor 4 of any suitable type, which is merely diagrammatically indicated in FIGS. 1 and 2, feeds the filled sacks 1, which are still open, to an aligning and guiding device for the open sack end. When the sack is moving into this device, an operator grasps the open end 5 of the sack—this end is shown in a depending condition as the leading end—and inserts this end into a gap 6 of the device. The gap 6 is defined by and between the lower course 7 of an endless belt 8 revolving at the feeding speed of the sack, and the upper course 9 of an endless belt 10, which revolves also at the sack feeding speed. The rear boundary of the gap, considered from the inserting side, is defined by the angled end 11 of a guiding plate 12 provided in the aligning zone (see particularly FIG. 3). To enable an adjustment of the depth to which the sack end 5 can be inserted, the guiding plate 12 is adjustable transversely to the feeding direction. This adjustment is effected by a screw 13, which carries a nut member 14, to which the guide plate 12 is secured (see particularly FIG. 3). The screw 13 is rotatably and axially non-displaceably mounted in a wall 15 of the machine frame and at its end near the operator carries a handle 16. On both sides of the nut member 14, the guide plate 12 is supported by two brackets 17, which are secured to the frame wall 15. A reversing pulley 18 for the endless belt 10 is disposed adjacent to the guide plate 12. An aperture 19 in the plate 12 provides a passage for the upper course 9 of the belt 10, which moves directly over that portion of the guiding plate which adjoins the aperture 19 on the left in FIGS. 1 and 2.

The endless belt 8 extends around deflecting pulleys 20 to 23, the pulley 23 being arranged as a tensioning pulley. The deflecting puleys 20, 21 are rotatably mounted on a ram or support 24. The deflecting pulley 22 is connected to the ram 24 by an angle 25. The tensioning pulley is connected to the ram by a pivoted lever 26. The belt 8 is tensoned by a tension spring 27, which engages the pivoted lever 26 and is connected at its other end by an angle 28 to the ram 24. The ram 24 has lower and upper guide pins 29, 30, which are axially slidably mounted each in a bearing 31, which is secured to the frame wall 15. A solenoid 32 has a plunger connected to the guide pin 30 so that the ram 24 can be moved up and down between two limiting positions. The ram is shown in its upper limiting position in FIG. 1 and in its lower limiting position in FIG. 2. When the ram 24 is in its upper limiting position, the open end 5 of the sack can be inserted into the gap 6 between the two courses 7 and 9 of the belts 8 and 10. When the ram is in its lower limiting position, the two courses pinch and advance the sack end disposed between them.

Whereas the belt 8 extends only in the aligning range of the device, the belt 10 is continued to the left in the embodiment shown in FIGS. 1 and 2 throughout the device. Considered in the sack feeding direction, the endless belt 8 is continued by an endless belt 33. A back-up roller for the belt 10 is disposed opposite to a reversing pulley 34 disposed at the receiving end of the belt 33. The roller 35 is somewhat offset from the pulley 34 in the direction of movement. The reversing pulley 34 is fixed to a shaft 36 (see FIG. 4), which is driven by a drive means, not shown, so that the belt 33 moves at the same speed as the sack conveyor 4. The shaft 39, to which the back-up roller 35 is secured, is driven by a gear train 37, 38. A chain sprocket 40 is non-rotatably mounted on the shaft 39 beside the gear 38 and serves for driving the drive pulley 41 (FIGS. 1 and 2) for the endless belt 8. For this purpose, a chain sprocket, not shown, is secured to the shaft, not shown, of the pulley 41 and is driven by a chain, not shown, from the chain sprocket 40. Thus the wheels 33, 10 and 8 rotate all at the velocity of the sack conveyor 4 and are started at the same time as the sack conveyor.

The information sheets 2 are fed between the belts 8 and 33. The information sheets are torn from the free end of a pre-perforated web 42, which is withdrawn by withdrawing rollers 44, 45, 46 from a supply roll 43. The shaft 47 of the withdrawing roller 44 is driven by a separate drive means, not shown, and through a gear train 48, 49 drives the shaft 50 of the withdrawing roller 45 (see FIG. 4). The gear 49 is in mesh with a gear, not shown, on the shaft, not shown, of the withdrawing roller 46. The free end of the web 42 enters through a guide 51 (see FIGS. 1 and 2) between the belt 33 and a portion 34a of the reversing pulley 34 (see FIG. 4), on the one hand, and a pressure roller 52 (FIGS. 1 and 2), on the other hand. The latter is mounted in pivoted levers 53 outside their pivot 54 so that the pivoted levers can move the pressure roller 52 towards and away from the reversing pulley 34. In FIG. 1, the pressure roller does not engage the reversing pulley whereas the pressure-applying condition is shown in FIG. 2. The pivoted movement of the levers 53 is effected by a solenoid 55 through a bell-crank lever 56 and a link 57. The bell-crank lever 56 is rotatably mounted on the frame at 58. A roller 59 is freely rotatably mounted in parts of the machine frame and driven by the reversing pulley 34 and serves for guiding a torn-off reference sheet until it is between the belts 10 and 33. The distance of the roller 59 from the upper course 9 of the belt 10 is at least slightly larger than twice the thickness of the sack material.

For squaring the free sack end 5 moving in between the belts 10, 33, the shaft 39 carries in addition to the back-up roller 35 a circular knife 60 (see FIG. 4), which cooperates with the edge of a portion 34b of the reversing pulley 34, which serves as a back-up cutting edge. A pair of endless conveyor belts, 61, 62, which are shown only in FIG. 4 and at the receiving end shown here move around a reversing pulley 63 or 64, serve for discharging the cut-off sack material. The reversing pulley 63 is non-rotatably mounted on the shaft 36 and the reversing pulley 64 is non-rotatably mounted on the shaft 39. As is apparent from FIG. 4, the circular knife 60 and the reversing pulley 64 are not directly mounted on the shaft 39 but on the hub of the back-up roller 35 for the belt 10. This roller is non-rotatably connected to the shaft 39.

The described apparatus operates as follows:

To feed the sacks 1 to the apparatus, the drive of the sack conveyor 4 is started and with it the drive for the endless belts 8, 10, 33. The apparatus is now in the initial position shown in FIG. 1. When a sack is fed on the sack conveyor 4, the operator grasps the open end 5 of the sack and inserts it into the gap 6 while the feeding of the sack is continued. The free end 5 is inserted into the gap to such an extent that the edge lies against the angled end 11 of the guide plate 12 throughout the width of the sack. By a deliberate operation, e.g., of a pedal switch, the solenoid 32 is then energized so that the ram 24 moves to its lower limiting position shown in FIG. 2. When the ram has been lowered, the sack end inserted into the gap 6 is gripped by the belts 8 and 10 and is guided when the feeding of the sack is continued.

A feeler arm 65 disposed under the pressure roller 52 in the path of the information sheets is associated with a switch, not shown in more detail, for controlling the withdrawal of the plastics material web 42, which has been pre-perforated in accordance with the length of the information sheets. The feeler arm 64 is influenced by the plastics materials sheets in such a manner that the leading free end of the web runs up on the feeler arm between the reversing pulley 34 and the pressure roller 52 and moves the feeler arm pivotally outwardly so that the feeler arm operates the switch to de-energize the drive means for the withdrawing rollers 44–46. The distance from the withdrawing rollers 46, 45 to the reversing pulley 34 and the pressure roller 52 is selected so that only one transverse series of perforations of the web 42 can be disposed in this range.

The open end 5 of the sack has been gripped between the belts 8, 10, as has been described hereinbefore, and as the feeding of the sack is continued this free end is released by the belt 8 and moves under the belt 33. During the further movement of the sack, its leading edge engages a feeler arm 66 of a switch, which is in circuit with the solenoid 55 for forcing the roller 52 against the reversing pulley 34. The feeler arm 66 is disposed beside the confronting courses of the belts 10 and 33. The movement of the feeler arm 66 in response to the engagement by the sack edge results in the energization of the solenoid 55 and by a pivotal movement of the levers 53 forces the rollers 52 against the reversing roller 34 for the conveyor belt 33. As the reversing roller rotates and the pressure roller 52 is also driven at the sack feeding speed by means which are not shown, an information sheet is torn along the series of perforations adjacent to the guide 51 from the web 42, which is at a standstill at this time, and this sheet is applied to the open sack end 5. The switch provided with the feeler arm 66 controls the solenoid 55 by means of a time-limit relay, so that the circuit of the solenoid 55 is interrupted after an adjustable period of time and its plunger is retracted by a spring 67 and causes the pressure roller 52 to perform a reverse pivotal movement.

When the torn-off information sheet has moved past the feeler arm 65, which has been pivotally moved away from the free end of the web 42, this feeler arm can swing back to re-energize the means for advancing the web 42. This advance will be continued until the feeler arm 65 is again caused to perform an outward pivotal movement by the leading end of the web 42.

FIG. 2 shows the instantaneous condition in which an information sheet has just been torn from the web 42 and is being fed to the open sack end, which is fed between the pairs of belts 8, 10 and 33, 10. During the entry between the pair of belt 10, 33, a marginal strip 68 is cut from the open sack end and from the information sheet, as is apparent from FIG. 4.

As the feeding of the sack 1 is continued, its open end guided between the belts 10 and 33, and the information sheet 2 lying on said end reach the welding device, which is diagrammatically indicated in FIG. 2 at 69. The welding device may be arranged to perform any suitable known welding process. It is suitable to use a device for performing a fusion welding process. When the sack end closed by welding has passed through a cooling zone, not shown, it is released by the belts 10, 33 and the sack is now fed by the conveyor 4, e.g., to a loading apparatus.

Instead of controlling the solenoid 32 by a switch which is deliberately operable, e.g., by the foot, the switch used for this purpose may have a feeler arm which is disposed adjacent to the stop 11 for the top edge of the sack and operable by the sack edge. It is suitable to provide two spaced apart feeler arms adjacent to the stop, which must both be operated by the sack edge for an energization of the solenoid. Such an arrangement will ensure that the open end of the sack has properly been inserted between the belts 8 and 10 before these belts grip the sack end between them. In the case described last, the solenoid 32 must also be controlled by way of a time-limit relay.

The apparatus shown in FIG. 5 differs from the apparatus just described with reference to FIGS. 1 to 4 only with respect to the feeder for the information sheets. Like parts are designated with like reference characters. The description of the aligning and guiding device for the open sack ends is not repeated. Whereas in the embodiment described hereinbefore, the starting material for the information sheets consists of a pre-perforated web of plastics material, the starting material for the information sheets in the apparatus shown in FIG. 5 consists of a web 70 of plastics material, which has only been printed with the desired information. This web 70 is pulled in steps by withdrawing rollers 44, 45, 46 from a supply roll 71. Just as with the first embodiment, each withdrawing step corresponds to the length of one information sheet. The pressure roller 52 used in the first embodiment is replaced by an endless pressure belt 72, which extends around two reversing pulleys 73, 74 and revolves constantly at the same speed as the belts 8, 10, 33.

An open sack end, which is gripped and advanced by the belts 8, 10, operates with its leading edge in this embodiment a feeler arm 75 of a switch. The outward pivoted movement of the feeler arm 75 causes this switch to energize via a time-limit relay a solenoid 76, which operates a guillotine 77, 78. An information sheet which has thus been cut off at the free end of the web 70 is fed by the pressure belt 72 to the end of the sack. The distance from the reversing pulley 73 to the guillotine 77, 78 is such that the leading end of an information sheet will be disposed between the belt 72 and a clamping strip 79 when the trailing end of the information sheet is just disposed between the cutting edges of the two knives 77 and 78 of the guillotine. The clamping strip being resiliently urged against the belt 72, the end of the web 70 is tensioned, and when the guillotine has been operated the severed information sheet 2 is fed to the open end of the sack. When an information sheet has been cut off, the drive means for the withdrawing rollers 44 to 46 is automatically energized. When the web has been withdrawn by the length of one information sheet, this drive means is de-energized by a photoelectric cell 80, which is controlled by marks printed on the web 70 and spaced apart by a distance corresponding to the desired length of the information sheet.

In the two embodiments which have been described, the belts 8, 10, 33, and 72 revolve in a vertical plane. Alternatively, the apparatus might be inclined so that the gap 6 does not extend horizontally from the outside inwardly, as is particularly apparent from FIG. 3, but is inclined from bottom left to top right, with reference to FIG. 3, so that the operator can more easily insert the open end of the sack into the gap.

What is claimed is:

1. Apparatus for closing filled plastic bags and simultaneously securing information sheets thereto, said apparatus comprising, in combination, bag conveying means, means for guiding the edges of the open ends of the filled bags, means for feeding the information sheets to said bags, and welding means arranged downstream of said feeding means and adapted to close the bags by the application of welded seams and to simultaneously join the information sheets to the bags by said welded seams, and wherein said guiding means comprises two oppositely facing conveyor belts and an aligning plate disposed behind said belts on one side thereof, driving, reversing and tensioning pulleys for said belts, a carrier receiving the driving, reversing and tensioning pulleys of one of said belts, and lifting means adapted to move said carrier towards the other one of said belts soon after the arrival of a bag end to be closed, said apparatus further comprising cutting means arranged between said feeding means and said welding means and adapted to square the bag edges and the information sheets disposed thereon.

2. Apparatus according to claim 1, characterized in that the feeding means for the information sheets (2) includes a control switch (66, 75), which is disposed in the path of the incoming sack edge portions (5) so as to be operated by the contact thereof.

3. Apparatus according to claim 2, characterized in that the feeding means further comprises withdrawing rollers (44–46) for an information sheet web (42) wound on a supply roll (43) and provided with a transverse series of perforations, said rollers arranged to feed the free end of the web between two disengaged pressure rollers (34, 52) means for continuously rotating one of said pressure rollers (34), and means including a positioning device (53, 58) for moving the pressure rollers toward each other, said positioning device being operated by said control switch.

4. Apparatus according to claim 3, characterized in that another switch (65) is disposed in the path of the information sheet web behind the pressure rollers (44–46), relative to the direction of movement of the information sheet web for de-energizing the withdrawing rollers when said other switch (65) is engaged by the free end of the web.

5. Apparatus according to claim 2, characterized in that the feeding means comprises photocell-controlled withdrawing rollers (44–46) for an information sheet web (70) wound on a supply roll (71), and said withdrawing rollers arranged to feed the free end of the web to such an extent between the open cutting edges (77, 78) of a cutter (76–78) coupled to be operated by the control switch (75) such that the free end is stopped in a position in which it is spaced from the cutter by the length of one information sheet, and a further conveyor (72–74) being provided to feed the severed information sheet (2) to the sack workpiece (1).

References Cited
UNITED STATES PATENTS

| | | | |
|---|---|---|---|
| 3,022,620 | 2/1962 | Gallet | 53—137 |
| 3,173,232 | 3/1965 | Mercer | 53—137 |
| 2,291,280 | 7/1942 | Joplin | 53—137 |
| 2,571,103 | 10/1951 | Belcher et al. | 53—137 |
| 2,725,168 | 11/1955 | Lindstaedt et al. | 198—165 X |
| 2,956,612 | 10/1960 | Gaines et al. | 156—355 |
| 2,987,107 | 6/1961 | Sylvester et al. | 53—372 |
| 2,987,858 | 6/1961 | Kerker | 53—137 X |
| 3,199,262 | 8/1965 | Miller et al. | 53—137 X |

THERON E. CONDON, *Primary Examiner.*

N. ABRAMS, *Assistant Examiner.*

U.S. Cl. X.R.

53—14, 137; 156—355; 229—70